United States Patent [19]

Matsukawa et al.

[11] Patent Number: 4,829,093
[45] Date of Patent: May 9, 1989

[54] OIL-CONTAINING RESIN AND ITS COMPOSITION

[75] Inventors: Noritomo Matsukawa, Yokohama; Katsutoshi Ishioka, Fujisawa, both of Japan

[73] Assignee: NOK Corporation, Tokyo, Japan

[21] Appl. No.: 59,926

[22] Filed: Jun. 9, 1987

[30] Foreign Application Priority Data

Jun. 18, 1986 [JP] Japan .................................. 61-142300
Feb. 10, 1987 [JP] Japan .................................. 62-30096
May 7, 1987 [JP] Japan .................................. 62-110979

[51] Int. Cl.⁴ .......................... C08J 9/36; C08J 9/40; C08L 61/00; C08L 69/00
[52] U.S. Cl. .................................... 521/53; 428/407; 521/31; 521/32; 521/33; 521/54; 521/136; 521/138; 521/139; 521/148; 524/267
[58] Field of Search ................. 428/407; 521/31, 148, 521/32, 33, 53, 54, 139, 136, 138; 524/267

[56] References Cited

U.S. PATENT DOCUMENTS

| | | | |
|---|---|---|---|
| 3,966,489 | 6/1976 | Barrett et al. | 521/32 |
| 3,991,017 | 11/1976 | Barrett et al. | 521/33 |
| 4,152,496 | 5/1979 | Barrett et al. | 521/38 |
| 4,263,407 | 4/1981 | Reed | 521/33 |
| 4,690,825 | 9/1987 | Won | 521/63 |

Primary Examiner—Herbert J. Lilling
Attorney, Agent, or Firm—Fred Philpitt

[57] ABSTRACT

The present invention provides an oil-containing resin having a flowability of not more than 45° in terms of an angle of repose, which comprises a porous styrene-divinylbenzene copolymer and a liquid oil adsorbed on the copolymer, an oil-containing resin mixture in a paste form of the oil-containing resin and a liquid oil, and a composition of the oil-containing resin mixture in a paste form and a thermoplastic resin. Owing to a good flowability, the oil-containing resin has a good moldability, and also owing to a high oil content, a molding having distinguished sliding characteristics is obtained from the composition of the oil-containing resin mixture in a paste form and a thermoplastic resin.

4 Claims, 1 Drawing Sheet

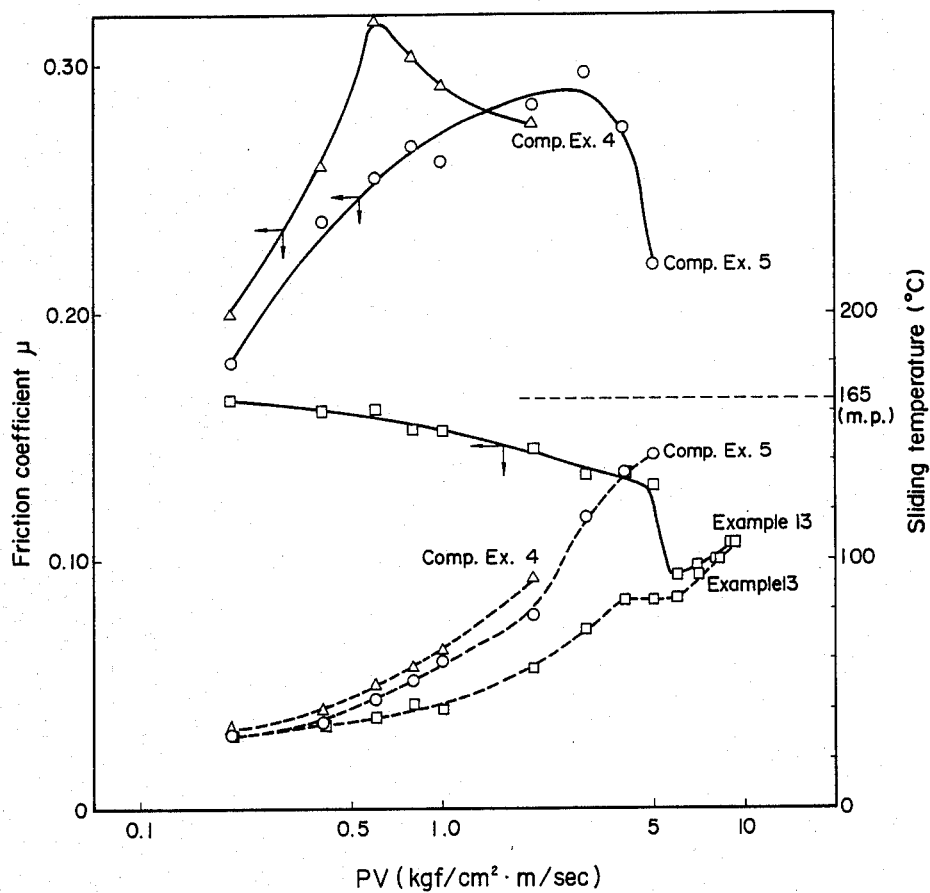

OIL-CONTAINING RESIN AND ITS COMPOSITION

BACKGROUND OF THE INVENTION

1. Field of the Invention

This invention relates to an oil-containing resin and its composition, and more particularly to an oil-containing resin capable of producing moldings with improved sliding characteristics and its compositon.

2. Description of the Prior Art

In order to improve the sliding characteristics of thermoplastic resins for use as a sliding material, a method for adding thereto a solid lubricant typical of tetrafluoroethylene resin powder has been widely used. On the other hand, an oil-containing resin comprising a thermoplastic resin and a liquid oil has been also used. In the latter case of oil-containing resin, a mixture of a matrix resin and a liquid oil idly slips at the hopper inlet of a screw extruder owing to the oil attached to the matrix resin and is not bitten into the extruder when it is to be kneaded in the extruder, and substantially no oil-containing resin can be obtained. Furthermore, the conventional oil-containing resin has various problems on the workability, moldability, physical properties of moldings, etc., as mentioned in Japanese patent applicatin Kokai (Laid-open) No. 51-6243, and it now keenly desired to solve these problems.

Another known example of specific oil-containing resin is a porous resin prepared by sintering polyethylene of ultra-high molecular weight, e.g. an average molecular weight of 500,000 or more, and impregnated with a lubricating oil. This oil-containing resin is used as a lubricating material by mixing it with various thermoplastic resins (Japanese Patent Publication No. 47-29374). However, the lubricating materials containing the polyethylene of ultra-high molecular weight have the following disadvantages:

(1) The polyethylene of ultra-high molecular weight has a melting point of 135° to 136° C., and thus cannot be used at a higher temperature than the melting point.

(2) The polyethylene of ultra-high molecular weight has the following thermal behavior: the particles, melt at about 190° C. and adhere to one another and are brought into a sintered state, and undergo abrupt thermal decomposition at 250° C. or higher. Thus, when the oil-containing, sintered polyethylene powder is kneaded into a molding material matrix by a screw extruder at a temperature of 190° C. or higher, the sintered resin melts and is liable to undergo deformation, so that the oil adsorbed in the sintered resin will be dispersed directly into the molding material matrix from the deformed sintered resin.

Furthermore, polyamide, polyacetal, etc. have no affinity to oil, as described in the said Japanese Patent Publication No. 47-29374, and thus when the oil-containing, sintered polyethylene powder is kneaded into the polyamide, polyacetal, etc. at a temperature of 190° C. or higher, the oil separated from the sintered powder is dispersed into the polyamide, polyacetal, etc. having no affinity to the oil, and no desired lubricating material can be obtained.

(3) Important factors that can give sliding characteristics to the oil-containing resin are an amount of oil oozing from the resin onto the sliding surface and a duration of the oozing. When fine polyethylene particles of ultra-high molecular weight having a substantially spherical shape are ideally sintered, the pore capacity will be at most about 40% by volume (=0.4 ml/g), and actually pore capacities of less than 30% by volume are shown in Examples of the said Japanese Patent Publication No. 47-29374. Thus, the amount of the oil to be held by impregnation, that is, the amount of oil to ooze, is limited.

As a result of extensive studies of a method for improving the sliding characteristics of thermoplastic resin without deteriorating the workability, moldability, etc., and without bringing about the said disadvantages of the oil-containing, sintered polyethylene of ultra-high molecular weight, the present inventors have found that an oil-containing resin comprising porous styrene-divinylbenzene copolymer and a liquid oil adsorbed on the copolymer can largely improve the sliding characteristics of a thermoplastic resin as admixed.

SUMMARY OF THE INVENTION

An object of the present invention is to provide an oil-containing resin having a large oil content and a good flowability.

Another object of the present invention, is to provide an oil-containing resin having less surface stickiness and thus a good biting when the resin is fed to a screw extruder or a screw injection molding machine together with a thermoplastic resin.

Further object of the present invention is to provide an oil-containing resin capable of improving the sliding characteristics (frictional wearing characteristics) of thermoplastic resin moldings.

These objects can be attained by an oil-containing resin comprising a porous styrene-divinylbenzene copolymer and a liquid oil adsorbed thereon, the oil-containing resin having a flowability of not more than 45° in terms of an angle of repose. The said objects can also be attained by a composition comprising the said oil-containing resin and a thermoplastic resin.

DETAILED DESCRIPTION OF THE PREFERRED EMBODIMENTS

Porous styrene-divinylbenzene copolymers for use in the adsorption of a liquid oil are resins whose divinylbenzene parts act as cross-linking points of styrene groups, and include those having apparent pores and those having no apparent pores. These resins are commercially available as Diaion (trademark of products made by Mitsubishi Kasei Kogyo K.K., Japan). These having apparent pores (Diaion HP series) have pores, 16 to 8,000 Å in pore size and 0.1 ml/g or more in pore capacity, and have a strong adsorbability, but the pore volume is so large that it is said that, when water is drained off from the commercially available resin products, because the commercially available products are sold with their pores being completely filled with water, air enters into the pores and prevents the resin from contact with a solution to be treated.

In the present invention, powders or particles of such a water-containing synthetic adsorbent having a function to remove impurities from an aqueous solution by adsorption as a precursor for microporous type ion exchange resin is heated at a temperature of about 80° to about 150° C. for about 3 to about 15 hours to completely dry the powders or particles, and then a liquid oil having a viscosity of about 5 to about 70,000 centistokes (at 40° C.) is made to be adsorbed on the pore parts. In order to make the adsorption complete, the dried powders or particles are impregnated with the liquid oil in the form of a solution in an organic solvent. The solution permeates into the powder or particles of porous styrene-divinylbenzene copolymer as a dried synthetic adsorbent while driving the air off the pores.

Even the copolymer resins having no apparent pores can swell when immersed in an organic solvent such as toluene, etc. as will be described in detail later and it has been found by observing the swelling state by an electron microscope that pores are developed by the swelling. Thus, such copolymer resins can be deemed to be a kind of porous resins. The copolymer resin can be impregnated with a liquid oil by itself, by way of such pores, but the impregnation rate of the liquid oil by itself is so low that it is preferable to use an organic solvent, that is, to impregnate the pores developed by swelling with a liquid oil in the form of a solution in an organic solvent, as described above.

The solution of liquid oil in an organic solvent includes, for example, mineral oil or silicone oil in an aromatic hydrocarbon such as benzene, toluene, xylene, etc.; ester oil in a ketone such as acetone, methylethyl ketone, etc.; polyglycol oil in an alcohol such as methanol, ethanol, etc., or a ketone such as acetone, etc.; polyfluorocarbon oil in a halogenated hydrocarbon such as trichlorotrifluoroethane or solvent mixture of it with methylene chloride, tetrachlorodifluorethane, etc., and is usually used as a solution having a concentration of at least about 20% by weight.

The impregnation is caried out by stirring the powders or particles of porous copolymers in the solution of a liquid oil in an organic solvent, and then the powder or particles are subjected to heating at about 50° to 150° C. and/or reduced pressure to remove the organic solvent from the powders or particles by evaporation, whereby the liquid oil is adsorbed on the copolymer in an amount corresponding to not more than the pore capacity of the porous resin. Thus, an oil-containing resin can be obtained.

The thus obtained oil-containing resin has an oil content as large as, for example, 1.1 to 1.2 ml/g, and the resin particles themselves do not stick to one another and stay in a dry state. That is, the resin has a good flowability, for example, an angle of repose of not more than 45° according to a flowability test procedure in terms of an angle of repose, using a powder tester made by Hosokawa Micron K.K., Japan. That is, at an angle of repose of not more than 45°, the liquid oil is adsorbed in an amount not more than the pore capacity of the porous resin, and mixing and dispersion of the oil-containing resin with or into powders or particles of various thermoplastic resins as will be given below can be readily carried out in that state.

The oil-containing resin is mixed with powders or particles of various thermoplastic resins such as polyethylene, polypropylene, polystyrene, ABS resin, polyacetal, 6-nylon, 6,6-nylon, 11-nylon, 12-nylon, ethylene-tetrafluoroethylene copolymer, polyvinylidene fluoride, polymethyl methacrylate, polybutylene terephthalate, polyethylene terephthalate, polycarbonate, etc. with stirring in a mixer such as a ribbon mixer, a V-shaped blender, etc. and then the mixture is kneaded in a screw extruder to form pellets. The thus obtained pellets can be molded in an injection molding machine, a heat press, etc. without impairing their workability, moldability, etc.

Particularly polyacetal (acetal resin) is a toughest resin having a prominent fatigue resistance, a good resilience, a low moisture susceptibility, good solvent and chemical resistances, and a good electrical insulation, and thus is effectively used in such applications as bushings, ball sheets, gears, etc. By mixing it with the present oil-containing resin, moldings of the mixture can have improved sliding characteristics without impairing the workability, moldability, etc.

In preparing a composition of the present oil-containing resin with the thermoplastic resin, about 5 to about 50% by weight of the oil-containing resin is used so that the composition can have an oil content of about 3 to about 30% by weight. Outside the said range, the desired improvement of the frictional wearing resistance cannot be obtained, for example, in the case that the thermoplastic resin is polyacetal, and particularly the wearing resistance is impaired.

As the oil-containing resin, a mixture of at least two kinds of the resins containing different kinds of liquid oils from each other, for example, a mixture of a mineral oil-containing resin and a silicone oil-containing resin, or a mixture of an ester oil-containing resin and a polyfluorocarbon oil-containing resin can be used, or a mixture of at least two kinds of resins containing liquid oils of different viscosities from each other, for example, a mixture of a porous copolymer containing mineral oil of 30 centistokes and a porous copolymer containing mineral oil of 480 centistokes, can be used.

The oil-containing resin can be further admixed with a liquid oil, and used in a mixture with a thermoplastic resin. The liquid oil to be admixed is preferably the same liquid oil as adsorbed on the porous copolymer in advance, but different kinds of liquid oil can also be used. The liquid oil is admixed with the oil-containing resin in a ratio of not more than about 50 parts by weight, preferably about 3 to about 30 parts by weight per 100 parts by weight of the oil-containing resin to form an oil-containing resin mixture in a paste form. The oil-containing resin mixture in the paste form has an angle of repose of not more than 65° in contrast to the angle of repose of not more than 45° of the original oil-containing resin as an index for the flowability.

The oil-containing resin mixture in the paste form is used as a mixture with a thermoplastic resin in an amount of about 25 to about 50% by weight in terms of the oil-containing resin so that the composition can have an oil content of about 3 to about 30% by weight. Even if the total amount of the liquid oil used is within the range of about 3 to about 30% by weight, the oil will be separated from the mixture during the mixing with the thermoplastic resin, when the proportion of the liquid oil adsorbed on the porous copolymer is smaller and the prcportion of the liquid oil admixed later is larger, as will be given later in Table 5 of Example 14, and thus the liquid oil is admixed in an amount of about 25 to about 50% by weight in terms of the oil-containing resin used for forming the oil-containing resin mixture in the paste form.

The oil-containing resin composition in the paste form can be further admixed with an appropriate amount of various fillers having particle sizes of not more than about 500 μm such as an inorganic filler, for example, graphite, talc, bronze, copper, molybdenum disulfide, etc.; an organic filler, for example, polytetrafluoroethylene, polyimide, poly-p-oxybenzoate, phenol resin, etc.; or a fibrous filler, for example, carbon fiber, glass fiber, kevlar fiber, potassium titanate whiskers, etc. during the mixing with the thermoplastic resin.

The present oil-containing resin has a large adsorbed oil content, but a low swelling tendency, and the surface stickiness by oil is so low even in the oil-containing state that a good biting can be obtained even if fed into a screw extruder or a screw injection molding machine together with a thermoplastic resin. These effect are peculiar effects obtained only with microporous beads based on the styrene-divinylbenzene copolymer, and no such effects can be obtained with similar microporous beads based on $SiO_2$, as will be shown later in comparative Example 6.

When the present oil-containing resin is mixed with a thermoplastic resin, the mixing ratio of the present oil-containing resin can be decreased owing to the large adsorbed oil content of the oil-containing resin, and thus sliding characteristics (frictional wearing characteristics) of the thermoplastic resin can be effectively improved without impairing the moldability of the thermoplastic resin. Particularly in the case of mixing with polyacetal, a remarkable improvement of the frictional wearing resistance can be obtained in a wide PV region.

The present invention will be described in detail below, referred to Examples and drawing.

BRIEF DESCRIPTION OF THE DRAWING

Single FIGURE is a diagram showing a relationship between the PV value and the friction coefficient or the sliding temperature in Example 13 and Comparative Examples 4 to 5.

EXAMPLE 1 AND COMPARATIVE EXAMPLE 1

5.0 l (3,290 g) of porous styrene-divinylbenzene copolymer beads (Diaion HP-20, trademark of a product made by Mitsubishi Kasei Kogyo K.K., Japan) were spread on a stainless steel palette, 50 cm×50 cm×10 cm, placed in an electric drying oven and dried by heating at 105° C. for 15 hours until the copolymer had a constant weight of 1,400 g by drying.

Then, 1,000 g of the dried porous copolymer beads was placed into a stainless steel container having a capacity of 5 l, and 1,640 g of mineral oil [NKL-30, a product made by NOK Klueber K.K., Japan; viscosity; 30 centistokes (at 40° C.)] as a solution in 400 g of toluene was added thereto, and the container was stirred to impregnate the copolymer beads with the mineral oil solution. Then, the impregnated copolymer beads were spread again on the said stainless steel palette, placed in an explosion-proof, electric drying oven, and heated at 120° C. for 6 hours to remove toluene therefrom by evaporation, whereby the mineral oil was made to be adsorbed onto the porous copolymer beads. The adsorbed copolymer beads showing an angle of repose of 34° amounted to 2,640 g.

Then, 492 g (24.6% by weight) of the mineral oil-adsorbed, porous copolymer beads having an oil content: 15.3% by weight and 1,508 g (75.4% by weight) of 6,6-nylon powder (Amylan CM3006, trademark of a product made by Toray Co., Japan) were mixed together, and the mixture was molded into tensile test prices (ASTM D-638 type I) and flat plates (30 mm× 60 mm×2 mm) by an injection molding machine (IS45-P, type number of a product made by Toshiba Kikai K. K, Japan) (Example 1). Likewise, tensile test prices and flat plates only of 6,6-nylon were molded (Comparative Example 1).

The injection molding conditions for Example 1 and Comparative Example 1 were as follows:

| Cylinder temperature: | Hopper side: | 240° C. |
|---|---|---|
| | Center: | 250° C. |
| | Nozzle side: | 260° C. |
| | Nozzle: | 270° C. |
| Mold temperature: | | 80° C. |
| Injection pressure (primary pressure): | | 60 kg/cm² |
| Clamping pressure: | | 160 kg/cm² |
| Screw revolution: | | 100 rpm |
| Injection time: | | 8 seconds |
| Cooling time: | | 10 seconds |
| Cushion: | | 10 mm |
| Injection speed: | | 3 seconds |

These test pieces were subjected to measurement of specific gravity, tensile strength and firctional wearing characteristics [load: 2kg/cm² (condition 1) or 10 kg/cm² (condition 2), peripheral speed 0.5 m/sec., counterpart steel material: S45C, and counterpart roughness: 1.5 S]. The results are shown in Table 1.

TABLE 1

| Measurement items | Example 1 | Comparative Example 1 |
|---|---|---|
| Specific gravity | 1.09 | 1.14 |
| Tensile strength (kg/cm²) | 350 | 780 |
| [Frictional wearing characteristics] (condition 1) | | |
| Frictional coefficient | 0.29 | 1.10 |
| Wearing coeficient (condition 2) | $12.2 \times 10^{-6}$ | $224 \times 10^{-6}$ |
| Frictional coefficient | 0.11 | — |
| Wearing coefficient | $10.9 \times 10^{-6}$ | — |

(Note)

Wearing coefficient: $\dfrac{cm}{(kg/cm^2)(m/sec)hr}$ (the wearing coefficient will be hereinafter referred to in this sense)

EXAMPLES 2 TO 5

Mixing ratios of the mineral oil-adsorved porous copolymer beads to 6,6-nylon was changed to various degrees in Example 1, and the moldablility of the resulting mixtures was investigated.

The results ar shown in the following Table 2.

TABLE 2

| | Mineral oil-adsorbed, porous copolymer beads | | |
|---|---|---|---|
| Example | mixing ratio (wt. %) | Oil content (wt. %) | Moldability |
| 2 | 5 | about 3 | moldable |
| 3 | 45 | 27.5 | moldable |
| 4 | 50 | 30.5 | moldable with slight oil separation |
| 5 | 55 | 33.5 | considerable oil separation |

EXMAPLES 6 TO 10

500 g of the same dried porous copolymer beads as used in Example 1 was added to 500 g (Example 6) or 250 g (Examples 7 to 10) of various kinds of oil as solutions in 200 g (Example 6) or 250 g (Examples 7 to 10) of various organic solvents and impregnated therewith with stirring, and various mineral oil-adsorbed porous copolymer beads were prepared in the same manner as in Example 1.

(Solutions of various kinds of oil in various organic solvents used in Examples)

Example 6: a solution of polyfluorocarbon oil (polyfluorocarbon oil 400 made by NOK Klueber K.K., Japan; viscosity: 400 centistokes) in trichlorotrifluoroethane Example 7: a solution of ester oil (Ester oil 400 made by NOK Klueber K.K., Japan; viscosity: 400 centistokes) in acetone Example 8: a solution of polyglycol oil (polyglycol 600 made by NOK Klueber K.K., Japan; viscosity: 600 centistokes) in methanol Example 9: a solution of polyglycol oil (polyglycol 900 made by NOK Klueber K.K., Japan; viscosity: 900 centistokes) in methanol Example 10: a solution of silicone oil (SH200, a product of Toray Silicone K.K., Japan; viscosity: 100 centistokes) in toluene All of the mineral oil-adsorbed porous copolymer beads obtained in these Examples had no adhesion to one another and had an angle of repose of not more than 30°.

These mineral oil-adsorbed, porous copolymer beads were mixed with 2,000 g of 6,6-nylon in the same manner as in Example 1, and molded. Good moldability was obtained from all of the mixtures.

EXAMPLE 11 AND COMPARATIVE EXAMPLE 2

1,310 g of the same mineral oil-adsorbed, porous copolymer beads as obtained in Example 1 and 3,690 g of acetal resin (Duracon M90-02, a product made by Polyplastics K.K., Japan) were mixed together, and molded in the same manner as in Example 1 (Example 11).

Molding of only acetal was carried out (Comparative Example 2).

The molding injection conditions were as follows:

| Cylinder temperature | Hopper side: | 165° C. |
| --- | --- | --- |
| | Center: | 170° C. |
| | Nozzle side: | 180° C. |
| | Nozzle: | 190° C. |
| Mold temperature: | | 80° C. |
| Injection pressure (primary pressure): | | 60 kg/cm² |
| Clamping pressure: | | 150 kg/cm² |
| Screw revolution: | | 100 rpm |
| Injection time: | | 8 seconds |
| Cooling time: | | 10 seconds |
| Cushion: | | 10 mm |
| Injection speed: | | 3 seconds |

Results of measurements made in the same manner as in Example 1 are shown in the following Table 3.

TABLE 3

| Measurement items | Example 11 | Comparative Example 2 |
| --- | --- | --- |
| Specific gravity | 1.25 | 1.40 |
| Tensile strength (kg/cm²) | 360 | 620 |
| [Frictional wearing characteristics] (Condition 1) | | |
| Friction coefficient | 0.15 | 0.34 |
| Wearing coefficient | $50 \times 10^{-6}$ | $250 \times 10^{-6}$ |
| (Condition 2) | | |
| Friction coefficient | 0.12 | (melted) |
| Wearing coefficient | $15 \times 10^{-6}$ | (melted) |

EXAMPLE 12

To a liquid mixture of toluene and mineral oil [product made by NOK Klueber K.K., Japan; viscosity: 30 centistokes (at 40° C.)] in a 1:1 ratio by weight, was admixed one part by weight of styrene-divinylbenzene copolymer powder (Diaion MP-A, a product made by Mitsubishi Kasei Kogyo K.K., Japan) per 1.25 parts by weight of the mineral oil, and the mixture was stirred for about 5 to about 10 minutes. Then, the copolymer powder was separated from the liquid mixture and dried at 60° C. for 24 hours to remove toluene therefrom, whereby the copolymer powder was impregnated with the total amount of the mineral oil.

Then, 15 parts by weight of the thus obtained mineral oil-impregnated styrene-divinylbenzene copolymer powder (angle of repose: not more than 45°) and 85 parts by weight of acetal resin (Duracon M90-02) were mixed in a Henschel mixer, then pelletized in an extruder and molded into flat plates, 25 mm×100 mm×2 mm, by an injection molding machine (IS45-P).

The injection molding conditions were as follows:

| Cylinder temperature, | Hopper side: | 150° C. |
| --- | --- | --- |
| | Center: | 180° C. |
| | Nozzle side: | 200° C. |
| | Nozzle: | 190° C. |
| Mold temperature: | | 80° C. |
| Injection pressure (primary pressure): | | 750 kg/cm² |
| Clamping pressure: | | 150 kg/cm² |
| Screw revolution: | | 100 rpm |
| Injection time: | | 8 seconds |
| Cooling time: | | 13 seconds |
| Cushion: | | 10 mm |
| Injection speed: | | 5 seconds |

EXAMPLE 13

In Example 12, 20 parts by weight of the mineral oil-impregnated styrene-divinylbenzene copolymer powder and 80 parts by weight of the acetal resin were used.

COMPARATIVE EXAMPLE 3

Test pieces for measurement were prepared only from the acetal resin by injection molding.

COMPARATIVE EXAMPLE 4

Test pieces for measurement were prepared from 20 parts by weight of polytetrafluoroethylene and 80 parts by weight of the polyacetal by injection molding.

COMPARATIVE EXAMPLE 5

Test pieces for measurement were prepared from a round bar material made of commercially available oil-containing acetal resin (Oilless #80, a product made by Oilless Kogyo K.K., Japan) by machining.

The test pieces for measurement, obtained in the foregoing Examples 12 to 13 and Comparative Examples 3 to 5, were subjected to a Suzuki type fictional wearing test under the following test conditions:

| Atmosphere: | room temperature, no lubrication |
| --- | --- |
| Surface presure P: | 5 kgf/cm² |
| Peripheral speed V: | 0.2 m/sec. |
| Counterpart material: | S45C |
| Counterpart roughness: | 1.5S |
| Time: | 24 hours |

The values of frictional coefficient $\mu$ (dimensionless) and wearing coefficient ($\times 10^{-6}$ cm.cm².sec/kgf.m.hr) under these conditions are given in the following Table 4.

TABLE 4

|  | Friction coefficient | Wearing coefficient |
| --- | --- | --- |
| Example 12 | 0.15 | 50 |
| Example 13 | 0.12 | 30 |
| Comparative Example 3 | 0.40 | 290 |
| Comparative Example 4 | 0.30 | 93 |
| Comparative Example 5 | 0.26 | 120 |

In order to make comparison of the characteristics at various PV values and the limit PV values, changes in the fiction coefficient (full lines) and the sliding temperature (dotted lines) against the PV value were measured for the test pieces of Example 13 and Comparative Examples 4 and 5 by changing the peripheral speed V to various degrees for a time until the friction coefficient became constant (about 30 to about 90 minutes) under the same conditions for measurement as above, and the results are shown in the diagram of the single Figure. Measurement of the sliding temperature was made by imbedding a thermocouple in the counterpart material and reading the temperature near the sliding region.

It can be said from these results that the friction coefficient is higher at all the PV value in Comparative Examples 4 and 5 than Example 13, and as to the limit PV value, PV=9 in Example 13, whereas PV=2 in Comparative Example 2 and PV=5 in Comparative Example 5. Furthermore, in Comparative Examples 4 and 5, changes in the friction coefficient are larger at one PV value after another, and the friction coefficient increases with increasing PV value in the range of PV=0.2-0.5 or PV=0.2-3, respectively, whereas in Example 13, the changes in the friction coefficient are small in the range of PV=0.2-0.5. That is, the test pieces of Example 13 have a low friction coefficient, kept stably throughout the PV range, and also have a high limit PV value, and thus can be used in a broad PV range.

EXAMPLE 14

The same mineral oil-adsorbed, porous copolymer beads (oil-containing resin) as in Example 1 was admixed with a predetermined amount (an amount to make the total amount of the mineral oil 27.4% by weight) of the same mineral oil as the mineral oil adsorbed on the oil-containing resin of Example 1 to prepare an oil-containing resin mixture in a paste form. The oil-containing resin mixture in the paste form was palletized together with 6,6-nylon (Amylan CM3006) by a mixing extruder.

TABLE 5

| No. | 6,6-nylon (wt. %) | Oil-containing resin (wt. %) | oil content (wt. %) | Mineral oil admixed (wt. %) |
| --- | --- | --- | --- | --- |
| 1 | 57.4 | 40 | 24.8 | 2.6 |
| 2 | 59.3 | 35 | 21.7 | 5.7 |
| 3 | 61.2 | 30 | 18.6 | 8.8 |
| 4 | 63.1 | 25 | 15.5 | 11.9 |
| 5 | 63.8 | 23.2 | 14.4 | 13.0 |

(State of oil-containing mixtures in a paste form)

No. 1 had an angle of repose of 55°, Nos. 2–4 were in a thixotropic state, and No. 5 was in a dilatant state.
(Pelletization)

Nos. 1–3 showed no stickiness to the hopper or no idling at the screw and could be pelletized with a good moldability; No. 4 had a good moldability but a slight oil separation; No. 5 had a considerable oil separation.

COMPARATIVE EXAMPLE 6

1,000 g of porous $SiO_2$-based microporous beads (Syloid 800, a product made by Fuji-Davison Kagaku K.K., Japan; pore capacity: 1.6 ml/g pore size: about 100–about 200 Å; average particle size: 4 μm) were spread on a stainless steel palette, 50 cm×50 cm×10 cm, admixed with 1,500 g of mineral oil (NKL-30) and stirred with a spatula and then the mixture was stirred in a Henschel mixer (blade revolution: 800 rpm, net capacity: 20 l) to prepare mineral oil-adsorbed microporous beads A.

1,600 g of silicone oil (SH-200) was used in place of the mineral oil, and likewise silicone oil-adsorbed microporous beads B were prepared.

These oil-adsorbed microporous beads A and B, and oil-unadsorbed microporous beads C (Syloid 800) were mixed with polyacetal (M90-02) in mixing ratios shown in the following Table 6, respectively, and extruded by a single-shaft screw type extruder (made by Tanabe Plastic K.K., Japan; cylinder diameter: 45 mm) under the following molding conditions by kneading to prepare pellets for injection molding.

TABLE 6

| No. | polyacetal wt. % | polyacetal vol. % | A wt. % | A vol. % | B wt. % | B vol. % | C wt. % | C vol. % |
| --- | --- | --- | --- | --- | --- | --- | --- | --- |
| 1 | 95.5 | 95 | 4.5 | 5 | | | | |
| 2 | 91.0 | 90 | 9.0 | 10 | | | | |
| 3 | 86.5 | 85 | 13.5 | 15 | | | | |
| 4 | 76.4 | 75 | | | 23.6 | 25 | | |
| 5 | 89.5 | 75 | | | | | 10.3 | 25 |

Cylinder temperature, hopper side: 170° C.
center: 175° C.
Die side: 175° C.
Die temperature: 180° C.
Screw revolution: 25 rpm In any of Nos. 1–5, the mixture was not bitten from the hopper opening of the extruder, that is, was not fed into the cylinder. When the mixture was forcedly fed into the extruder, a creaking noise was generated, and an eye-irritating gas and powder were only discharged from the nozzle end. That is, the mixture could not pelletized.

What is claimed is:

1. A composition which comprises an intimate admixture of:
    (A) 5–50% by weight of oil-containing copolymer having a flowability of not more than 45° in terms of angle of repose that is obtained by impregnating a dried porous stryrene-divinylbenzene copolymer with an oil selected from the group consisting of mineral oil, silicone oil, ester oil, polyglycol oil or polyfluorocarbon oil, having a viscosity of 5–70,000 centistokes (40° C.,) said oil being dissolved in an organic solvent during impregnation, said organic solvent being thereafter removed from the impregnated copolymer by evaporation, and
    (B) 95–50% by weight of a termoplastic resin selected from the group consisting of polyacetal, polyamide, polyolefin, polyalkylene terephthalate or polycarbonate, said intimate admixture containing 3–30% by weight of the oil set forth in (A).
2. A composition according to claim 1 wherein said polyamide resin is 6,6-nylon.

3. A composition that comprises an intmate admixture of
(A) a paste having a flowability of not more than 65° in terms of angle of repose, said paste being composed of
(a) 25-50% by weight, based on the composition, of oil-containing copolymer having a flowability of not more than 45° in term of angle of repose that is obtained by impregnating a dried porous styrene-divinylbenzene copolymer with an oil selected from the group consisting of mineral oil, silicone oil, ester oil, polyglycol oil or polyfluorocarbon oil, having a viscosity of 5-70,000 centistokes (40° C.) said oil being dissolved in an organic solvent during impregnation, said organic solvent being thereafter removed from the impregnated coppolymer by evaporation and
(b) an added amount of an oil seleted from the group consisting of mineral oil, silocne oil, ester oil, polyglycol oil or polyfluorocarbon oil, said added oil being in a ratio of 3-50 parts by weight per 100 parts by weight of oil-containing copolymer (a), and
(B) a thermoplastic resin selected from the group consisting of polyacetal, polyamide, polyalkylene terephthalate or polycarbonate,
said intimate admixture containing 3-30% by weight of the aforesaid oil.

4. A composition according to claim 3 wherein the polyamide resin is 6,6-nylon.

* * * * *